(12) United States Patent
Holtsberg et al.

(10) Patent No.: US 9,635,212 B2
(45) Date of Patent: Apr. 25, 2017

(54) DYNAMIC COMPRESSION RATIO SELECTION

(71) Applicant: Apple Inc., Cupertino, CA (US)

(72) Inventors: Anders Holtsberg, Los Gatos, CA (US); Brandon Corey, Palo Alto, CA (US); Martin Lindberg, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 14/502,629

(22) Filed: Sep. 30, 2014

(65) Prior Publication Data

US 2015/0350483 A1    Dec. 3, 2015

Related U.S. Application Data

(60) Provisional application No. 62/006,002, filed on May 30, 2014.

(51) Int. Cl.

| | |
|---|---|
| *H04N 1/21* | (2006.01) |
| *H04N 5/232* | (2006.01) |
| *H04N 19/172* | (2014.01) |
| *H04N 19/46* | (2014.01) |
| *H04N 19/115* | (2014.01) |
| *H04N 19/17* | (2014.01) |
| *H04N 19/154* | (2014.01) |
| *H04N 19/436* | (2014.01) |
| *H04N 19/134* | (2014.01) |

(52) U.S. Cl.
CPC ....... *H04N 1/2112* (2013.01); *H04N 5/23229* (2013.01); *H04N 19/115* (2014.11); *H04N 19/134* (2014.11); *H04N 19/17* (2014.11); *H04N 19/172* (2014.11); *H04N 19/46* (2014.11); *H04N 19/154* (2014.11); *H04N 19/436* (2014.11)

(58) Field of Classification Search
CPC .. H04N 1/2112; H04N 19/115; H04N 19/172; H04N 19/134; H04N 19/46; H04N 19/00; H04N 19/17; H04N 5/23229; H04N 19/436; H04N 19/154
See application file for complete search history.

(56) References Cited

U.S. PATENT DOCUMENTS

| | | | |
|---|---|---|---|
| 5,619,265 A | * | 4/1997 | Suzuki ............... H04N 1/2112 348/362 |
| 8,107,759 B2 | | 1/2012 | Park |

(Continued)

*Primary Examiner* — Jason Flohre
(74) *Attorney, Agent, or Firm* — Blank Rome LLP

(57) ABSTRACT

An image is compressed according to a compression ratio selected based on a compression metric. In one embodiment, the compression metric is based on image characteristics indicative of the amount of image noise in an image, such as gain and lux. Greater compression ratios are used for image having compression metrics indicating a higher degree of noise. Because an image with higher image noise levels already has a reduced visual quality, the impact of higher compression is less significant as compared to the impact of compression on images having low image noise. In an embodiment, an image is divided into a number of regions, for each of which a compression metric and corresponding compression ratio is determined, so that regions of the image having high image noise may be compressed more than regions having low image noise.

20 Claims, 8 Drawing Sheets

(56) References Cited

U.S. PATENT DOCUMENTS

| | | |
|---|---|---|
| 2006/0017835 A1 | 1/2006 | Jacobsen |
| 2009/0096883 A1* | 4/2009 | Ishii .................. H04N 5/217 348/222.1 |
| 2010/0231736 A1* | 9/2010 | Hosokawa ........... H04N 5/2351 348/222.1 |
| 2010/0309987 A1* | 12/2010 | Concion ................ H04N 5/772 375/240.26 |
| 2012/0099641 A1 | 4/2012 | Bekiares |
| 2012/0200737 A1* | 8/2012 | Jape .................. H04N 5/772 348/231.2 |
| 2013/0272622 A1 | 10/2013 | Islam |
| 2014/0218600 A1* | 8/2014 | Nakamura ......... H04N 5/23241 348/372 |

* cited by examiner

DYNAMIC COMPRESSION RATIO SELECTION

BACKGROUND

The present disclosure relates generally to digital imaging and, more particularly, to compressing digital images having varying levels of image noise.

Digital imaging devices appear in handheld devices, computers, digital cameras, and a variety of other electronic devices. Once a digital imaging device acquires an image, an image processing pipeline may apply a number of image processing operations to generate a full color, processed, compressed image in a standardized image format.

While advances in imaging technology enable ever increasing image quality, storage and data transmission concerns, especially for portable devices, continue to drive image and video compression standards to achieve smaller file sizes with increased fidelity. Strategies to achieve smaller file sizes quickly and with minimal loss in fidelity are therefore desirable.

SUMMARY

Methods, devices, and systems for selecting an image compression ratio are disclosed. Compression of a digital image can reduce image quality due to reduction in data and detail and the introduction of compression artifacts. While compression may significantly impact the visual quality of an image having high signal-to-noise ratio (SNR), the visual quality of an uncompressed image that already includes a certain degree of image noise due to a low SNR may not be significantly impacted by compression. As such, when storing digital images, images that are identified as having relatively higher degrees of image noise/low SNR may be compressed to a greater degree than images having a relatively lower degree of image noise/high SNR without significant losses in visual quality.

Image analysis needed to measure the amount of image noise in an image can be calculation intensive and time consuming. However, the amount of image noise in a digital image may be correlated with other image characteristics, for example, gain and lux, which may be easily obtained from an image processing pipeline data flow in modern digital image capture devices (e.g., digital camera). Often such characteristics and values are included in the metadata associated with an image. As such, in one embodiment, a compression metric indicative of the degree of image noise in an image is determined based on image characteristics that correlate with image noise. The compression metric may be used to select a compression ratio, such that images having higher image noise/lower SNR may be compressed to a greater degree than images having lower image noise/higher SNR.

In another embodiment, an image may be segmented into a number of regions. A separate compression metric and corresponding compression ratio may be determined for each region. In this manner, higher-image noise/low SNR regions of an image may be compressed to a greater degree, while the higher visual quality of lower-image noise/high SNR regions of the image may be preserved by use of a lower compression ratio for those regions.

DETAILED DESCRIPTION

Figure 1:
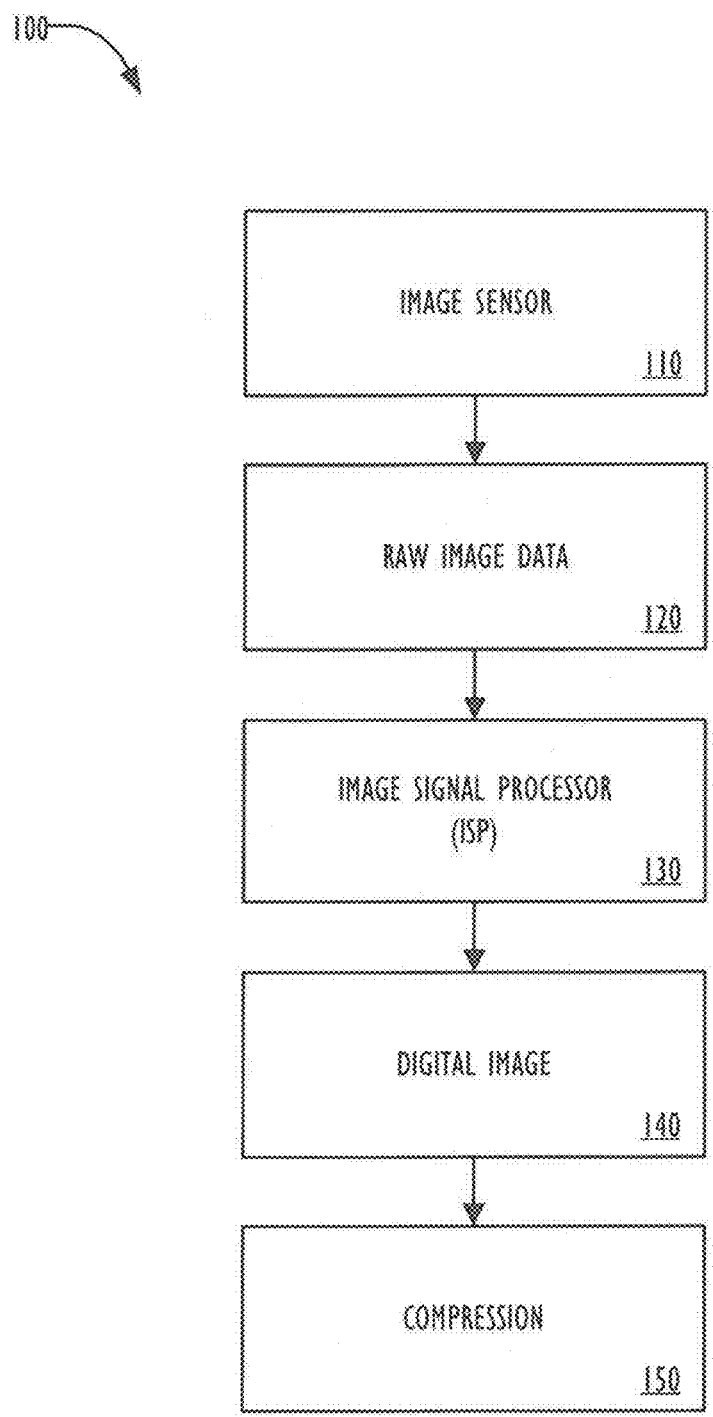
FIG. 1 illustrates an image pipeline, according to one embodiment.

Methods, devices, and systems for selecting an image compression ratio are disclosed. A compressed high quality digital image has lower visual quality as compared to the original digital image. However, compression of a low-quality, noisy digital image may not greatly affect the overall image quality. As such, when storing digital images, the image file size may be minimized (or substantially reduced) by selecting a compression ratio based on the amount of image noise in the image, where the compression ratio reduces the image size without significantly impacting the visual quality of the image. Full noise analysis of an image can be calculation-intensive and time consuming. However, the image noise in a digital image may be correlated with other image characteristics (e.g. gain and lux), which are often values included in the metadata associated with an image or otherwise easily determined along a camera's image pipeline. By estimating the amount of image noise in the original digital image based on these characteristics a compression ratio can be selected that reduces the image size but does not significantly impact the image's visual quality.

In one aspect, the compression ratio is based on a compression metric that may itself be based on one or more image characteristics correlated with image noise. The image characteristics may be readily available from an image processing pipeline, reducing the computation required to estimate image noise as compared to traditional noise analysis methods. In an embodiment, the gain or lux may be used as the basis of the compression metric informing the selection of a compression ratio. For compression metric values indicating a high degree of image noise, a higher compression ratio may be used, producing a lower-fidelity compressed image. For compression metric values indicating a low degree of image noise in an image, a lower compression ratio may be used, producing a higher-fidelity compressed image. The relationship between the compression metric and compression level may be continuous or discrete.

In another aspect, different compression ratios may be applied to different regions of an image. In an embodiment, an image is segmented into a number of regions, with the described compression metric analysis applied to each of the regions independently. This allows compression of noisy regions of the image having low local SNR to a larger degree than less-noisy regions of the image, which may enable further reduction in the image file size without significant losses in visual quality.

In the following description, for purposes of explanation, numerous specific details are set forth in order to provide a thorough understanding of the inventive concept. As part of this description, some of this disclosure's drawings represent structures and devices in block diagram form in order to avoid obscuring the disclosed embodiments. In the interest of clarity, not all features of an actual implementation are described in this specification. Moreover, the language used in this disclosure has been principally selected for readability and instructional purposes, and may not have been selected to delineate or circumscribe the inventive subject matter; rather, the claim language determines such inventive subject matter. Reference in this disclosure to "one embodiment" or to "an embodiment" means that a particular feature, structure, or characteristic described in connection with the embodiment is included in at least one implementation of the disclosed subject matter, and multiple references to "one embodiment" or "an embodiment" should not be understood as necessarily all referring to the same embodiment.

It will be appreciated that, in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design of an implementation of image processing systems having the benefit of this disclosure.

FIG. 1 illustrates an image pipeline 100, according to one embodiment. An image is generated when light from a scene hits an image sensor 110, generating raw image data 120, according to one embodiment. Image signal processor 130 produces a digital image file 140 from raw image data 120, where digital image file 140 includes digital image data and metadata. In block 150, digital image file 140 may be compressed according to one or more selected compression ratios in order to reduce the image file size.

By way of example, the image sensor 110 may include a CMOS image sensor (e.g., a CMOS active-pixel sensor (APS)) or a CCD (charge-coupled device) sensor. Generally, the image sensor includes an integrated circuit having an array of pixels, wherein each pixel includes a photodetector for sensing light. As those skilled in the art will appreciate, the photodetectors in the imaging pixels generally detect the intensity of light captured via the camera lenses. However, photodetectors, by themselves, are generally unable to detect the wavelength of the captured light and, thus, are unable to determine color information.

Accordingly, the image sensor may further include a color filter array (CFA) that may overlay or be disposed over the pixel array of the image sensor to capture color information. The color filter array may include an array of small color filters, each of which may overlap a respective pixel of the image sensor and filter the captured light by wavelength. Thus, when used in conjunction, the color filter array and the photodetectors may provide both wavelength and intensity information with regard to light captured through the camera, which may be representative of a captured image.

In one embodiment, the color filter array may include a Bayer color filter array, which provides a filter pattern that is 50% green elements, 25% red elements, and 25% blue elements. For instance, a 2×2 pixel block of a Bayer CFA includes 2 green elements (Gr and Gb), 1 red element (R), and 1 blue element (B). Thus, an image sensor that utilizes a Bayer color filter array may provide information regarding the intensity of the light received by the image capture device at the green, red, and blue wavelengths, whereby each image pixel records only one of the three colors (RGB). This information may be referred to as "raw image data" or data in the "raw domain," illustrated as block 120 in FIG. 1. Raw image data 120 has a variety of associated characteristics, including, for example, the date and time of capture, GPS location or geotag, aperture size, exposure time, camera type, analog gain, digital gain, lux and white-point. The number and type of characteristics will vary depending on the camera system and its capabilities. Some characteristics are associated with the image generally, some with the image capture device itself, and some are associated with an individual pixel element.

Raw image data 120 may then be processed by image signal processor (ISP) 130 to produce a digital image file 140. Image signal processor 130 may perform a variety of image processing functions, such as, for example, a Bayer transformation, demosaicing, noise reduction, white balancing, application of digital gain, and image sharpening. For example, image signal processor 130 may use one or more demosaicing techniques to convert the raw image data 120 into a full color image, generally by interpolating a set of red, green, and blue values for each pixel. Image signal processor 130 may also compute statistical properties of the image that can be used to measure the amount of image noise, including local SNR estimates.

Figure 2:
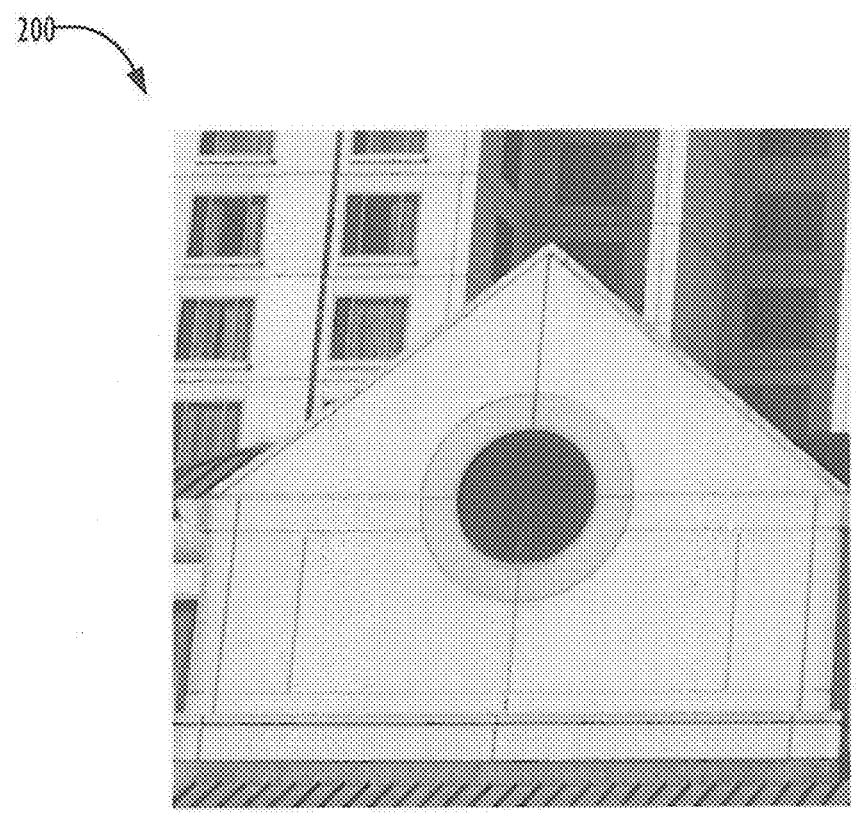
FIG. 2 illustrates examples of an image having low image noise/high SNR and an image having high image noise/low SNR.
Figure 2:
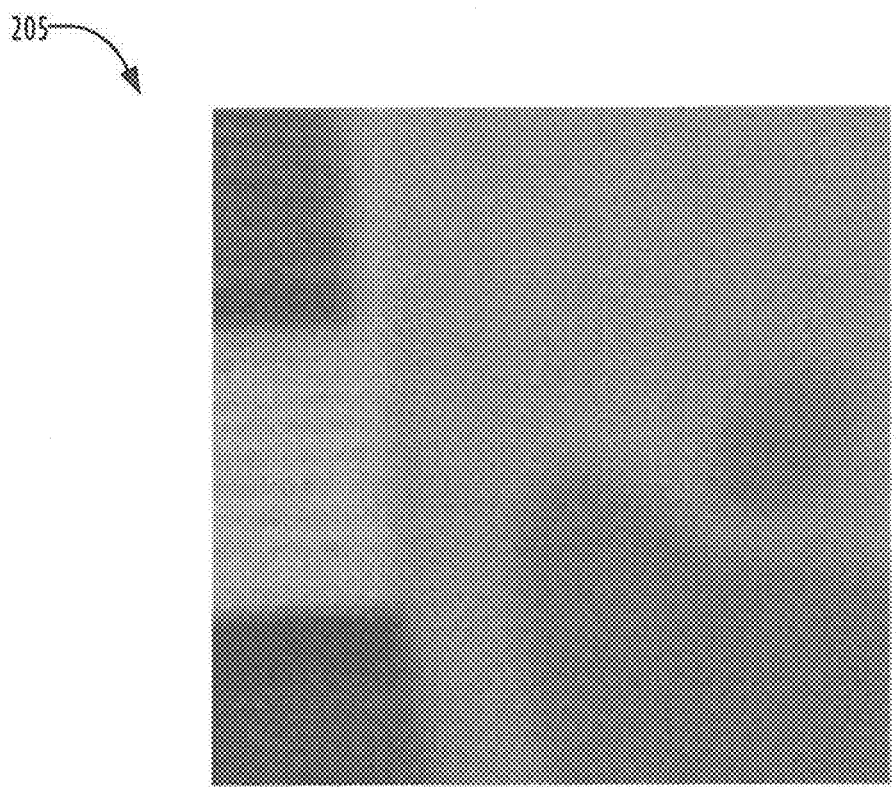

In one embodiment, the image signal processor 130 determines a compression metric associated with an image. In another embodiment, the compression metric is determined by a processor separate from the image signal processor 130, i.e., not by image signal processor 130. The compression metric may be correlated with the amount of image noise in an image. Noise is unwanted signal in an image, or signal that is not indicative of what is being measured. While noise always exists, it becomes visually evident in an image where the signal-to-noise ratio (SNR) is low. The SNR is low where the difference is small between an image sensor signal indicative of the imaged scene and a random signal, sensor noise, or light fluctuations also experienced by the image sensor. Visual image noise often originates, for example, in low-light situations, where the low amount of light hitting the sensor is on the same order as the noise signal generated by the sensor. As such, references to "image noise" herein refer to situations where the SNR for an image is low, such that the noise signal of some magnitude is evident in the image data. FIG. 2 illustrates a low image noise/high SNR image 200 and a high image noise/low SNR image 205. High SNR image 200 is characterized by crisp lines, uniform fill, and smooth gradients. Low SNR image 205 is characterized by grainy fill and mottled gradients.

In one embodiment, the compression metric informs the selection of a compression ratio used for the compression 150 of the digital image 140. The determination of the compression metric will be described in greater detail below, with respect to FIG. 3. Once determined, the compression metric may be included in the metadata of the image. In this way, the compression metric may be referenced during the compression 150, such that the compression metric informs the selection of the compression ratio. In another embodiment, the compression metric for an image is communicated directly to the compression stage 150 of the image pipeline.

In one embodiment, digital image file 140 includes image data and metadata. Digital image file 140 may be in a variety of uncompressed or losslessly compressed formats, for example, RAW and PNG. In one embodiment, the metadata associated with digital image file 140 includes the image characteristics discussed above with respect to the raw image data 120. In another embodiment, the metadata associated with digital image file 140 includes a compression metric correlated with image noise.

In block 150, the output of image signal processor 130 is compressed. That is, compression 150 reduces the overall file size of the digital image 140. For example, reducing the number of bytes required to store the digital image. Compression 150 may be lossless, whereby full fidelity of the image is preserved despite reduction in file size, or lossy, where image information is lost, that is, fidelity is reduced. Lossy compression 150 encompasses any method that reduces the size of a digital image file 140. Such methods may employ chroma subsampling, transform coding, predictive coding, quantization, entropy coding, and the like. Lossy compression 150 may, in particular, occur by a variety of industry standard methods, including JPEG, JPEG2000, JPEG-XR, and HEVC still image profile.

In one embodiment, compression 150 occurs according to a selected compression ratio. In one embodiment, the compression ratio may be selected by the image signal processor 130, and sent as an instruction to the compression process 150. In another embodiment, the compression ratio may be selected during the compression process 150 based on a compression metric correlated with image noise. In yet another embodiment, the compression ratio may be selected based on a compression metric by a separate processor and then communicated to the compression process 150.

While pipeline 100 is described with respect to a single digital image, one of ordinary skill in the art will recognize that it is equally applicable to video sequences. For example, a variety of characteristics may be associated with a video file. A compression metric may be derived from video characteristics that are correlated with image noise in the video image or sound. In an embodiment, a video compression ratio may be selected based on the determined compression metric. Video may be compressed according to a variety of industry standard methods, for example, MPEG, H.264, and HEVC.

Figure 3:
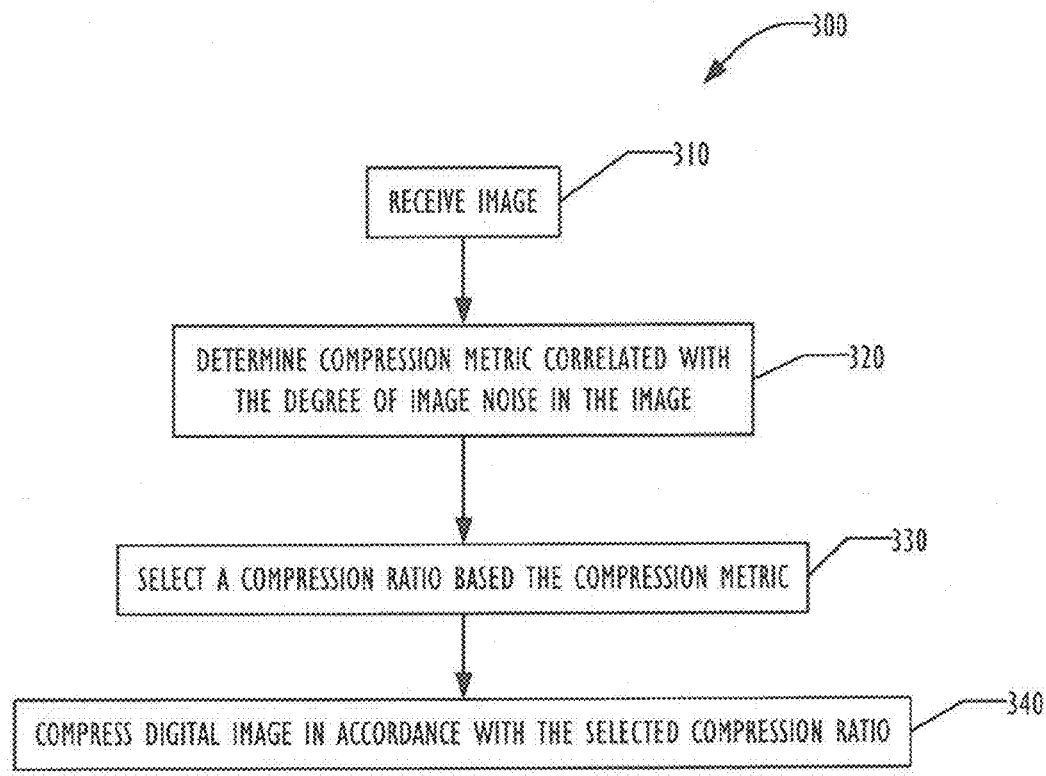
FIG. 3 is a flowchart illustrating a method for selecting an image compression ratio, according to one embodiment.

FIG. 3 is a flowchart illustrating a method 300 for selecting an image compression ratio, according to one embodiment. In block 310, an image is received. The image is in digital format. The image discussed herein may be in any Color Filter Array (CFA) format such as Bayer or in other color spaces such as RGB or various luma-chroma formats such as YCbCr. Other means to get data about the image is through processing by the Application Processor (CPU) or the ISP such as various statistical data. Other characteristics included in the meta data are the aperture value, brightness value, color space, exposure time and bias, flash information, focal length, FNumber, ISO speed rating, shutter speed value, image stabilization value, and white balance mode.

In block 320, a compression metric indicative of the degree of image noise in the image is determined, according to one embodiment. In one embodiment, the compression metric is derived from at least one image characteristic associated with the image. A variety of image characteristics may be correlated with the amount of image noise in an image. For example, images shot in low light conditions typically have a low SNR, which can result in high image noise. When little light is available for the sensor to generate an image signal, the image gain is typically increased. Where the gain is very high, not only is that part of the captured signal indicative of the image amplified, due to the low SNR, the sensor's noise is also amplified. As such, a high gain typically indicates the presence of image noise in an image.

The image characteristic lux may also be used to identify images that are likely to have image noise. Lux is the amount of light that hits a surface per unit area. As such, a low lux value, such as in low-light situations, has many of the same indications as a high gain value. That is, if an image's lux is low, the image sensor is exposed to a low amount of light. And again, where the signal is small, the image noise and signal are more likely to be confused. Therefore, a high gain value or a low lux value may be indicative of an image that is likely to have a lot of image noise. The gain and lux values for an image are typically stored as metadata, and thus more easily accessible as a noise metric than information obtained by analyzing the image data to identify actual image noise.

Therefore, a compression metric based on an image characteristic such as gain may be indicative of the amount of image noise in an image. In one embodiment, an individual image characteristic may serve directly as the compression metric. For example, the value of the digital gain of the image may be used as the compression metric value. In another example, the lux value for an image may be used as the compression metric value. In one embodiment, a single image characteristic may be mapped onto a compression metric scale, or normalized to determine the compression metric value. For example, the gain value may be divided by the maximum gain value for the camera system, in order to obtain a unit-less compression metric value.

More than one image characteristic may also be used to calculate the compression metric. In one embodiment, each image characteristic used for the compression metric calculation is indicative of image noise in an image. A compression metric function may be developed such that a number of image characteristics contribute to the compression metric value. In one embodiment, each image characteristic value has a coefficient that adjusts the weight and/or units of the characteristic value so that each image characteristic contributes in a meaningful way to the compression metric value. For example, if gain is highly indicative of image noise, while white-point is only slightly indicative of image noise, the gain coefficient may be selected so that the gain component has a greater influence on the compression metric value. Some image characteristics, such as lux, are inversely related to image noise—that is, the greater the lux, the lower the image noise is likely to be. As such, it may be necessary to adjust the compression metric in order to obtain the correct relationship between the compression metric and the compression ratio. An exemplary compression metric function is shown as Equation 1.

$$\text{metric value} = f(\text{gain}, \text{lux}, \ldots) = \omega_G G + \omega_{lux} L + \ldots, \quad (1)$$

where $\omega_G$ represents a weighting factor for the gain, G represents the gain, $\omega_L$ represents a weighting factor for the lux, L represents the lux.

In one embodiment, the compression metric function may be experimentally derived, for example, by performing a regression analysis of various image characteristics. As with single image characteristic values, the value generated by a compression metric function may be normalized, according to one embodiment. For example, the compression metric function may be designed to generate a compression metric value on a scale from 0 to 100.

Returning to FIG. 3, in block 330 a compression metric may be selected based on the compression metric, according to one embodiment. As used herein, the compression ratio is a measure of the degree to which the amount of data in an image is reduced by a compression algorithm. For example, in one embodiment, the compression ratio may be an explicit ratio of the original file size, in bytes, to the compressed file size, in bytes. In another embodiment, the compression ratio may be a value on a normalized scale from 0 to 100, where 0 is the greatest degree of compression, and 100 is an uncompressed (original) image. As described above, any suitable compression algorithm/format may be used. The exact compression ratios, spectrum, available for selection depends on the particular compression method/algorithm employed.

The relationship between the selected compression value and compression metric for an image may be defined so that the high visual quality of low image noise/high SNR images is preserved by using a compression ratio that is low on the full scale of compression ratios, while high image noise/low SNR images having low visual quality are compressed at a ratio that is high on the compression scale, as the loss of data due to compression may not significantly impact the visual quality of the noisy image as compared to the uncompressed version of the image.

Figure 4:
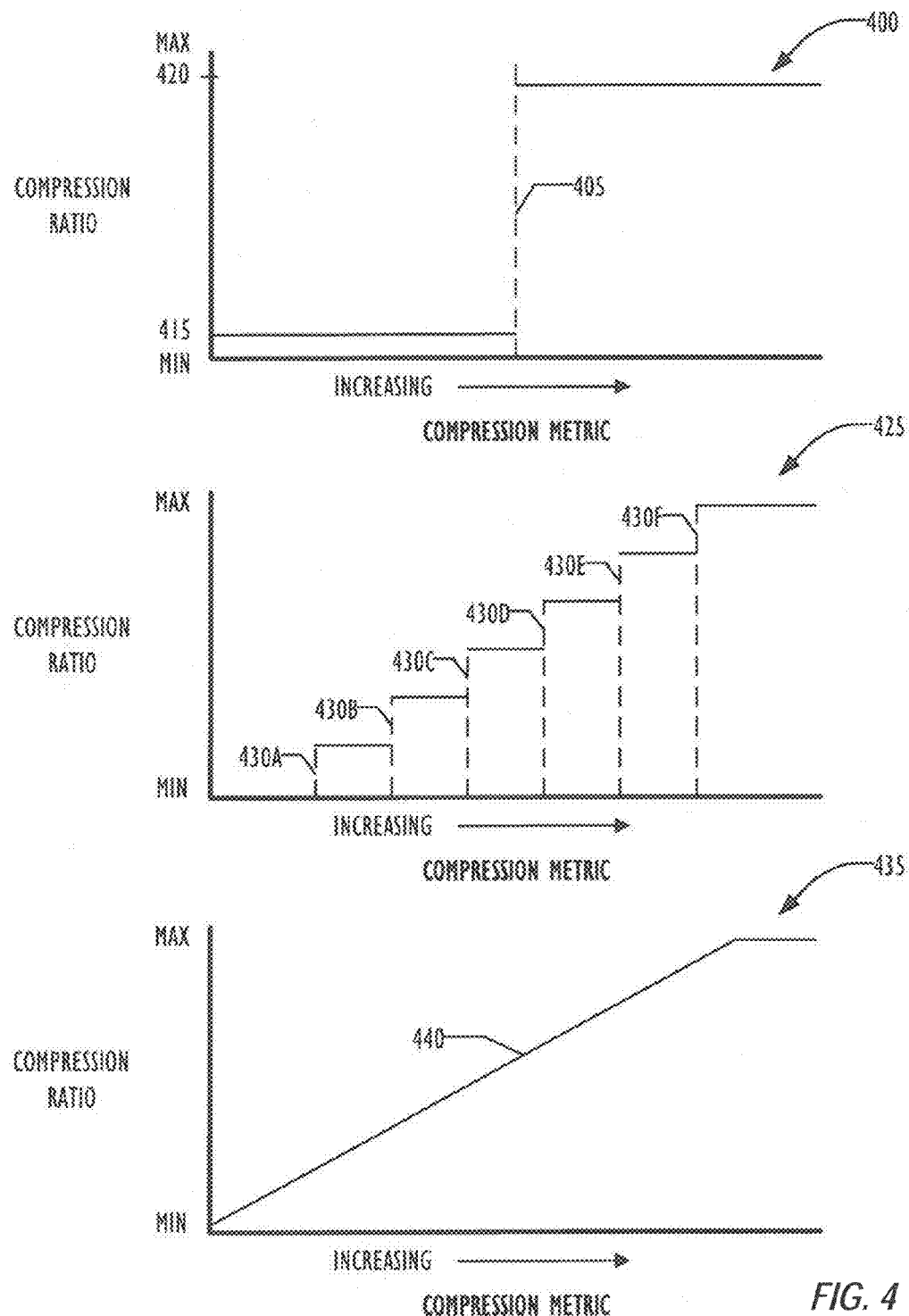
FIG. 4 illustrates the relationship between a compression metric and a degree of compression, according to one embodiment.

FIG. 4 illustrates exemplary relationships between an illustrative compression metric and the compression ratio. Plot 400 shows a single compression metric threshold 405. When the compression metric's value is below the compression metric threshold 405, the minimum compression ratio 415 may be used to compress the image. That is, when the compression metric value is small, indicating a low amount of image noise in the image, the image retains a certain degree of fidelity, detail and data/file size. This preserves detail and fidelity in an image having low image noise. In one embodiment, when the compression metric is below the compression metric threshold 405, the compression ratio is 1; that is, the image size is not reduced. When the compression metric is at or above noise threshold 405, the maximum compression ratio 420 may be used to compress the image. That is, when a large amount of image noise is detected in the image, the image file is reduced, as the image noise has already limited the visual quality and detail evident in the image, so any loss in fidelity due to compression does not significantly further reduce the visual quality of the image.

In Plot 425, a number of compression metric thresholds 430A-F define the relationship between the compression metric and the selected compression ratio, according to one embodiment. As the compression metric value increases, indicating an increasing degree of image noise in the image, the compression ratio may also increase. By using a number of compression metric thresholds, the degree of compression may be tailored to the degree of image noise in an image. Compression metric thresholds 430A-F are illustrated at regular intervals, with the compression ratio increasing the same amount at each compression metric threshold. However, the compression metric thresholds may be defined at any interval, and the corresponding compression ratio may increase by any amount. The compression metric thresholds may be informed, for example, by a perceptual model, which describes how a viewer's perception of an image is affected by various degrees of image noise.

In Plot 435, the relationship between the compression metric and the compression ratio is continuous, according to one embodiment. Though the relationship is illustrated as linear, it may have any shape whereby the compression ratio generally increases with an increasing compression metric.

In addition, the relationship between the compression metric and the compression ratio may be a combination of continuous and discrete, i.e. involving compression metric thresholds.

Returning to FIG. 3, in block 340, the digital image may be compressed in accordance with the selected compression ratio, according to one embodiment. Any suitable compression method may be used that is capable of compression at the selected ratio, for example, JPEG, JPEG2000, JPEG-XR, or the HEVC still image profile. It will be understood to one of ordinary skill in the art that the method illustrated by and described with respect to FIG. 3 may be used to compress video files in addition to image files.

Figure 5:
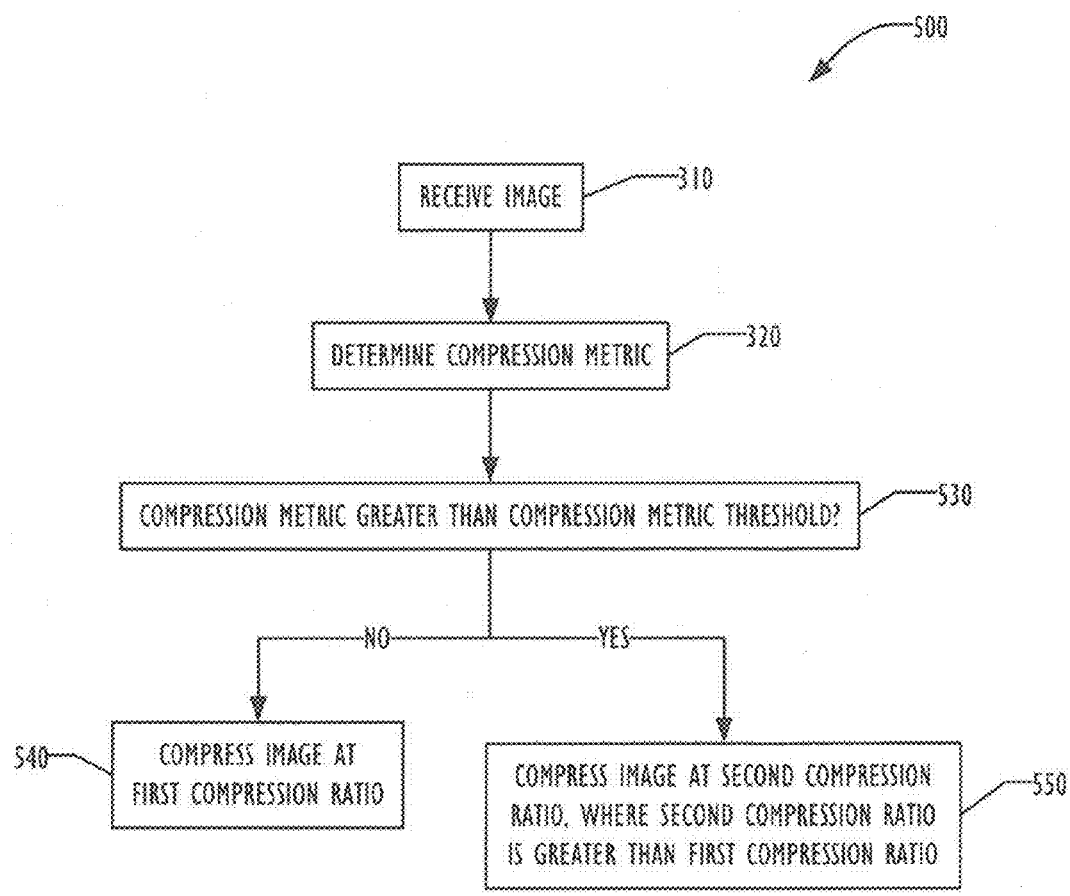
FIG. 5 is a flowchart illustrating a method for selecting an image compression ratio, according to another embodiment.

FIG. 5 is a flowchart illustrating a method 500 for selecting a compression ratio based on a compression metric, according to one embodiment. In block 310, an image is received, as described above. In block 320, a compression metric is determined, as described above. Next, in block 530, it is determined whether the compression metric is greater than a compression metric threshold, according to one embodiment. A noise threshold may be defined as described with respect to one of plots 400, 425, and 435 in FIG. 4, above. If the compression metric is not greater than the compression metric threshold, then, in block 540, the image is compressed at a first compression ratio, according to one embodiment. If the compression metric is greater than the compression metric threshold, the image is compressed according to a second compression ratio, where the second compression ratio is greater than the first compression ratio.

Figure 6:
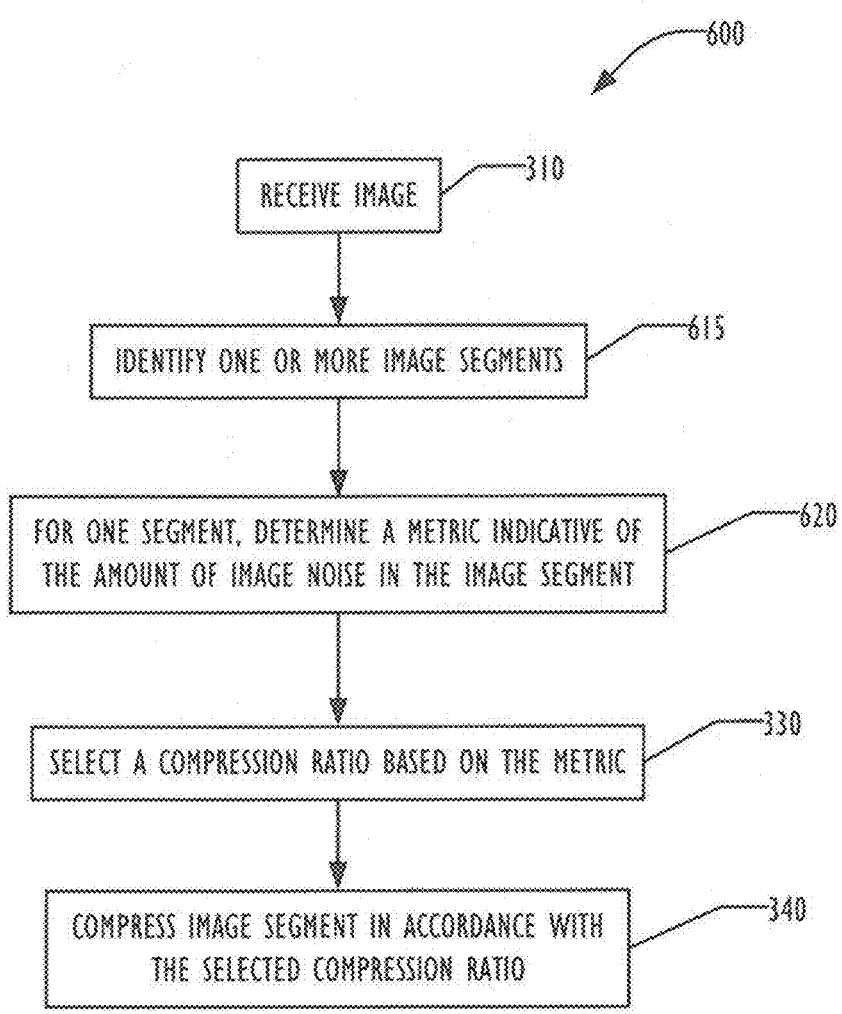
FIG. 6 is a flowchart illustrating a method for selecting an image compression ratio, according to yet another embodiment.
Figure 7:
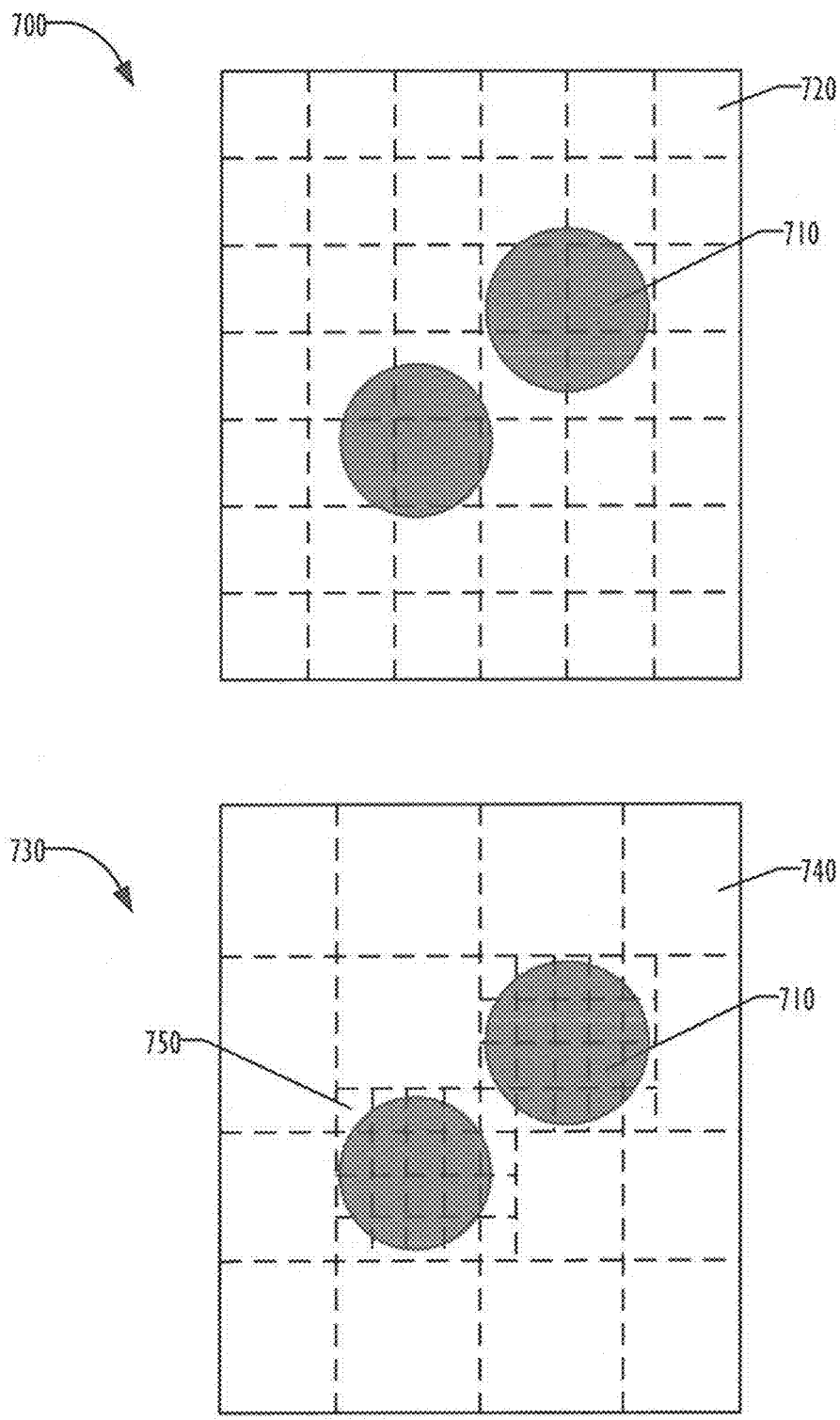
FIG. 7 illustrates regions of an image for which a compression metric is separately determined, according to one embodiment.

FIG. 6 illustrates a method 600 for determining a compression ratio for each of a number of regions of an image where the compression ratio is selected based on a compression metric, according to one embodiment. In block 310, an image is received, as described above. In block 615, one or more regions of an image are identified, according to one embodiment. In one embodiment, the regions may be identified by the image signal processor. In another embodiment, the regions are identified by a separate processor. Regions of the image may be identified by a variety of methods. For example, an image may be divided into a number of regions having equal area, as shown in image 700 of FIG. 7. Image 700 has been divided into a number of regions 720, according to one embodiment. Regions 720 are independent of the location of subject 710, according to one embodiment. Each region 720 may be evaluated to determine a compression metric and a compression ratio for each region 720 based on the respective region's compression metric. In this way, regions 720 containing larger amounts of image noise may be compressed to a greater degree than regions containing lower amounts of image noise.

In another embodiment, an image may be divided into regions of varying areas. The area and location of the regions may be based on a number of factors, such as the identification of an image subject, variances in image characteristics (e.g. gain or lux), or otherwise identified as areas likely to have high image noise. Image 730 includes regions of different areas, according to one embodiment. Image 730 includes larger background regions 740 and smaller subject regions 750, according to one embodiment. Subject regions 750 include the subject 710 of the image. In this example, the background of the image may have less detail, less focus, and/or greater image noise as compared to the subject 710. As such, the background regions 740 may have a higher compression metric than subject regions 710, and therefore may be compressed at higher compression ratios than those at which subject regions 710 are compressed. It is to be understood that a variety of methods can be used to define any number and/or size of regions within an image such that the different regions are each compressed using a compression ratio based on a compression metric particular to an individual region.

Returning to FIG. 6, in block 620, a compression metric is determined for one region of the image, according to one embodiment. A compression metric for the single region may be determined as discussed above with respect to block 320 of FIG. 3. Next, in block 330, a compression ratio may be selected based on the compression metric, as described above. Then, in block 340, the image region may be compressed in according to the selected compression ratio, as described above. Blocks 620, 330, and 340 may be performed on each region serially, in parallel, or a combination of the two. When performed serially, each block may be performed on each region in the image prior to proceeding to the next block, according to one embodiment. In another embodiment, blocks 620 and 330 may be performed to assign a compression ratio to each image region prior to proceeding to compression of each region in block 340. Each of blocks 620, 330, and 340 may be performed by the same or different processors.

Figure 8:
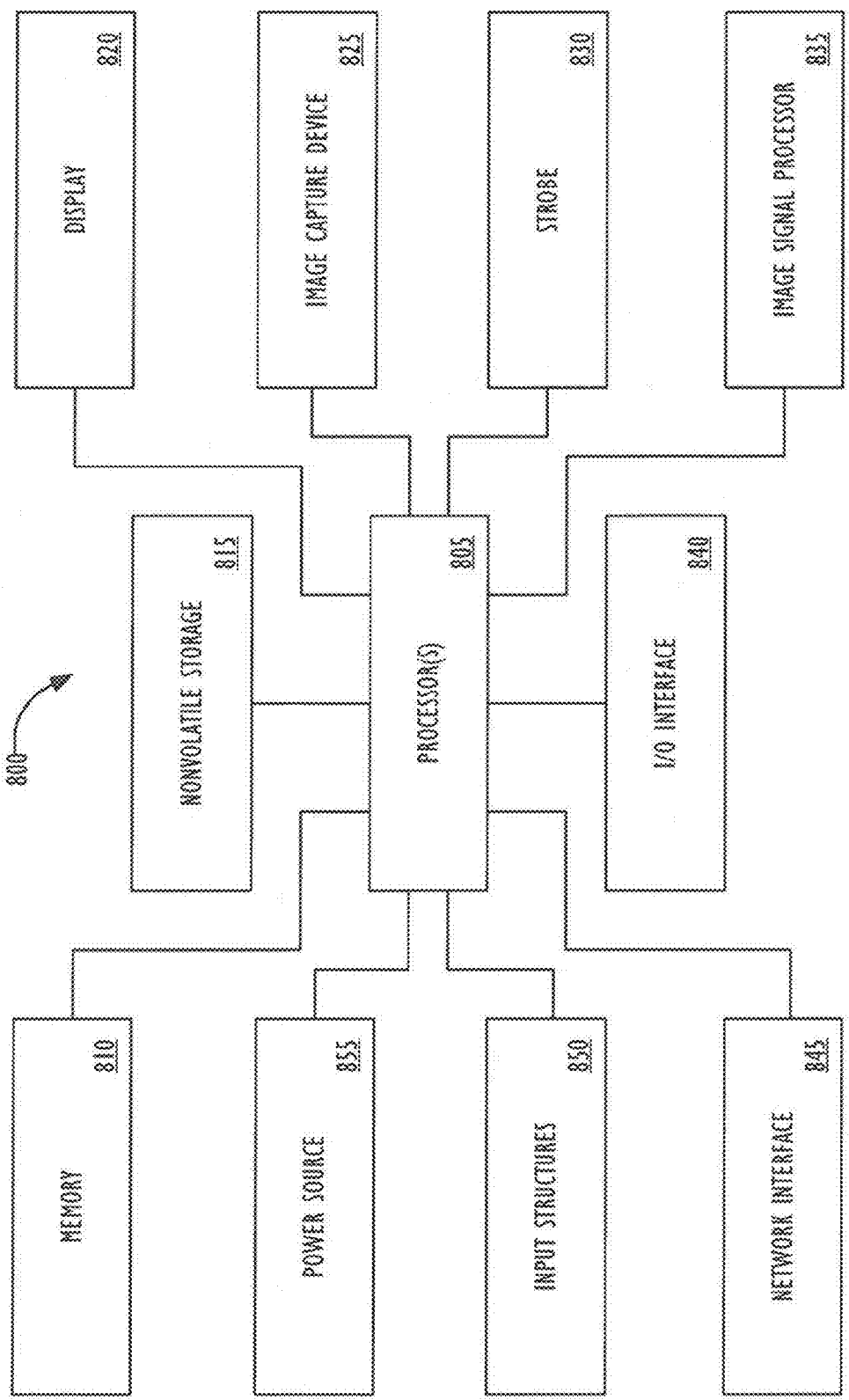
FIG. 8 illustrates a system for creating digital images compressed at a dynamically selected compression ratio, according to one embodiment.

FIG. 8 illustrates an electronic device 800 for performing the presently disclosed techniques and may include, among other elements, one or more processor(s) 805, memory 810, non-transitory storage 815, a display 820, one or more image capture element 825, a strobe 830, main image processor 835, an input/output (I/O) interface 840, network interfaces 845, input structures 850, and a power source 855. The various functional blocks shown in FIG. 8 may include hardware elements (including circuitry), software elements (including computer code stored on a non-transitory computer-readable medium such as, for example, storage 815) or a combination of hardware and software elements. It should further be noted that FIG. 8 is merely one example of a particular implementation and is intended to illustrate the types of components that may be present in electronic device 800.

By way of example, the electronic device 800 may represent a block diagram of a portable electronic device, such as a mobile phone or tablet computer system, or similar electronic devices, such as a desktop or notebook computer systems with similar imaging capabilities. It should be noted that the main image processor 835 block, the processor(s) 805, and/or other data processing circuitry generally may be referred to as data processing circuitry. Such data processing circuitry may be embodied wholly or in part as software, firmware, hardware, or any combination thereof. Furthermore, the data processing circuitry may be a single contained processing module or may be incorporated wholly or partially within any of the other elements within electronic device 800. Additionally or alternatively, the data processing circuitry may be partially embodied within electronic device 800 and partially embodied within another electronic device connected to device 800.

In the electronic device 800 of FIG. 8, the processor(s) 805 and/or other data processing circuitry may be operably coupled to the memory 810 and the non-transitory storage 815 to perform various algorithms for carrying out the presently disclosed techniques. These algorithms may be performed by the processor(s) 805 and/or other data processing circuitry (e.g., firmware or software associated with the main image processing 835) based on certain instructions executable by the processor(s) 805 and/or other data processing circuitry. Such instructions may be stored using any suitable article(s) of manufacture that include one or more tangible and non-transitory, computer-readable media to at least collectively store the instructions. The article(s) of manufacture may include, for example, the memory 810 and/or the non-transitory storage 815. The memory 810 and the non-transitory storage 815 may include any suitable articles of manufacture for storing data and executable instructions, such as random-access memory, read-only memory, rewritable flash memory, hard drives, and optical discs.

The image capture element 825 may capture frames of raw image data of a scene, typically based on ambient light. When ambient light alone is insufficient, the strobe 830 (e.g., one or more light emitting diodes (LED) or xenon strobe flash device) may temporarily illuminate the scene while the image capture element 825 captures a frame of raw image data. In either case, the frame of raw image data from the image capture element 825 may be processed before being stored in the memory 810 or non-transitory storage 815 or displayed on the display 820.

In particular, the illustrated image capture element 825 may be provided as a digital camera configured to acquire both still images and moving images (e.g., video). Such an image capture element 825 may include a lens and one or more image sensors configured to capture and converting light into electrical signals and is converted into a raw Bayer, RGB, or YCbCr format, as discussed above. Frames of such image data from the image capture element 825 may enter the main image processing 835 for processing. In some embodiments, the image signal processor 835 may include a dedicated hardware image signal processor and may include one or more dedicated graphics processing units.

The raw image data from the image capture element 825 also may be stored in a framebuffer in the memory 810 accessible to an alternative image processing capability of the electronic device 800. Alternative image processing denotes image processing performed apart from the main image processor 835, and includes image processing performed instead of, or in addition to, processing at the main image processor 835. Consequently, the term also includes processing performed outside of, but in support of, processing of image data by the main image processor 835.

Such an alternative image processing capability of the electronic device 800 may include, for example, image processing or image analysis running in software on the processor(s) 805. Additionally or alternatively, the alternative image processing capability of the electronic device 800 may include other hardware or firmware capable of analyzing the raw image data for certain characteristics. Furthermore, alternative image processing may contribute to the determination of a compression metric, selection of a compression ratio, or compression of an image, as disclosed herein.

The I/O interface 840 may enable electronic device 800 to interface with various other electronic devices, as may the network interfaces 845. These network interfaces 845 may include, for example, interfaces for a personal area network (PAN), such as a Bluetooth® wireless communication network, interfaces for a local area network (LAN), such as an 802.11x Wi-Fi network, and/or interfaces for a wide area network (WAN), such as a 3G or 4G cellular network. Through the network interfaces 845, the electronic device 800 may interface with other devices that may include a strobe 830. The input structures 850 of the electronic device 800 may enable a user to interact with the electronic device 800 (e.g., pressing a physical or virtual button to initiate an image capture sequence). The power source 855 of the electronic device 800 may be any suitable source of power, such as a rechargeable lithium polymer (Li-poly) battery and/or an alternating current (AC) power converter.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

We claim:

1. A system, comprising:
   an image sensor configured to output an image having a plurality of regions, wherein the regions include a first region and a second region;
   a memory; and
   at least one processor communicatively coupled to each of the image sensor and the memory, the memory storing instructions that when executed by the at least one processor cause the system to:
      obtain metadata associated with the image, wherein the metadata comprises at least one image characteristic that corresponds to image noise in each region of the image;
      determine a compression metric representative of an amount of image noise associated with each region of the image based on each region's corresponding at least one image characteristic;
      determine a compression ratio for each region based on each region's corresponding compression metric, wherein the compression ratio for each region increases as the amount of image noise indicated by the compression metric for each region increases, and wherein the compression ratio of the first region is different from the compression ratio of the second region;
      compress the regions in accordance with each region's corresponding compression ratio to generate a compressed image; and
      store the compressed image in the memory.

2. The system of claim 1, wherein the at least one image characteristic includes an image gain and a LUX level, and wherein the compression metric associated with each region of the image is directly related to the image gain at each region and inversely related to the LUX level at each region.

3. The system of claim 1, wherein the compression ratio and the compression metric for the regions have a continuous relationship based on a plurality of noise thresholds for the regions.

4. The system of claim 1, wherein the instructions to determine a compression metric comprise instructions to perform a weighted combination of the at least one image characteristic to determine the compression metric, wherein the weighted combination is based on how indicative the at least one image characteristic is in corresponding to the image noise at the regions of the image.

5. The system of claim 1, wherein the instructions to determine a compression metric comprise instructions to perform a regression analysis of the at least one image characteristic to experimentally derive the compression metric.

6. The system of claim 1, wherein the instructions to determine a compression ratio comprise instructions to determine the compression ratio for the first region based on the compression metric of the first region and independently of the compression metric of the second region.

7. A system, comprising:
   an image sensor configured to output an image having one or more regions;
   a memory; and
   at least one processor communicatively coupled to each of the image sensor and the memory, the memory storing instructions when executed by the at least one processor cause the system to:
      obtain metadata associated with the image, wherein the metadata comprises at least one image characteristic that corresponds to image noise at the one or more regions of the image;
      determine a compression metric representative of an amount of image noise associated with the one or more regions of the image based on each region's corresponding at least one image characteristic;
      determine a compression ratio for the one or more regions based on each region's corresponding compression metric, wherein the compression ratio for the one or more regions increases as the amount of image noise indicated by the compression metric increases, and wherein the instructions to determine the compression ratio comprise instructions to:
         set the compression ratio to a first value when the region's corresponding compression metric is less than a first threshold; and
         set the compression ratio to a second value that is greater than the first value when the region's corresponding compression metric is greater than or equal to the first threshold;
      compress the one or more regions in accordance with each region's corresponding compression ratio to generate a compressed image; and
      store the compressed image in the memory.

8. The system of claim 7, wherein the at least one image characteristic includes an image gain and a LUX level, and wherein the compression metric associated with the one or more regions of the image is directly related to the image gain at the one or more regions and inversely related to the lux level at the one or more regions.

9. A method, comprising:
   receiving, at an electronic device, an image from an imaging sensor in an image capture device;
   obtaining, at the electronic device, metadata associated with the image, wherein the metadata comprises a plurality of image characteristics that correspond to image noise at a plurality of regions of the image;
   determining, at the electronic device, a compression metric for each region of the image based on each region's corresponding metadata;
   determining, at the electronic device, a compression ratio for each region based on each region's corresponding compression metric, wherein the compression ratio for each region increases as the amount of image noise indicated by the corresponding compression metric increases;
   compressing, at the electronic device, the regions in accordance with each region's corresponding compression ratio; and storing the compressed image in memory at the electronic device, wherein the regions of the image include a first region with a first corresponding compression ratio and a second region with a second corresponding compression ratio that differs from the first corresponding compression ratio.

10. The method of claim 9, wherein the image characteristics include an image gain and a LUX level, and wherein the compression metric associated with each region of the image is directly related to the image gain at each region and inversely related to the LUX level at each region.

11. The method of claim 9, wherein determining a compression metric comprises performing a regression analysis of the at least one-image characteristic to experimentally derive the compression metric.

12. The method of claim 9, wherein determining a compression metric comprises performing a weighted combination of the image characteristics to determine the compression metric for each region of the image, wherein the weighted combination is based on how indicative each of the image characteristics closely correlates to the image noise at each region of the image.

13. A method, comprising:
receiving, at an electronic device, an image from an imaging sensor in an image capture device;
obtaining, at the electronic device, metadata associated with the image, wherein the metadata comprises a plurality of image characteristics that correspond to image noise at one or more regions of the image;
determining, at the electronic device, a compression metric for the one or more regions based on each region's corresponding metadata;
determining, at the electronic device, a compression ratio for the one or more regions based on each region's corresponding compression metric, wherein the compression ratio for the one or more regions increases as the amount of image noise indicated by the compression metric increases, and wherein determining the compression ratio comprises:
setting the compression ratio to a first value when the region's corresponding compression metric is less than a first threshold; and
setting the compression ratio to a second value that is greater than the first value when the region's corresponding compression metric is greater than or equal to the first threshold;
compressing, at the electronic device, the one or more regions in accordance with each region's corresponding compression ratio; and
storing the compressed image in memory at the electronic device.

14. The method of claim 13, wherein determining a compression metric comprises performing a regression analysis of the at least one image characteristic to experimentally derive the compression metric.

15. A programmable storage device storing instructions to cause one or more processors to:
receive an image from an imaging sensor in an image capture device;
obtain metadata associated with the image, wherein the metadata comprises at least one image characteristic that corresponds to image noise at a plurality of regions of the image, wherein the regions of the image include a first region and a second region;
determine a compression metric representative of an amount of image noise associated with each region of the image based on each region's corresponding at least one-image characteristic;
determine a compression ratio for each region based on each region's corresponding compression metric, wherein the compression ratio for each region increases as the amount of image noise indicated by the compression metric increases, and wherein the compression ratio of the first region is different from the compression ratio of the second region;
compress the regions in accordance with each region's corresponding compression ratio; and
store the compressed image in a memory.

16. The programmable storage device of claim 15, wherein the at least one image characteristic includes an image gain and a LUX level, and wherein the compression metric associated with each region of the image is directly related to the image gain at each region and inversely related to the LUX level at each region.

17. The programmable storage device of claim 15, wherein the instructions to determine a compression metric comprise instructions to perform a regression analysis of the at least one image characteristic to experimentally derive the compression metric.

18. The programmable storage device of claim 15, wherein the instructions to determine a compression metric comprise instructions to perform a weighted combination of the at least one image characteristic to determine the compression metric, the weighted combination is based on how indicative the at least one image characteristic is in corresponding to the image noise at each region of the image.

19. A programmable storage device storing instructions to cause one or more processors to:
receive an image from an imaging sensor in an image capture device;
obtain metadata associated with the image, wherein the metadata comprises at least one image characteristic that corresponds to image noise at one or more regions of the image;
determine a compression metric representative of an amount of image noise associated with the one or more regions of the image based on each region's corresponding at least one image characteristic;
determine a compression ratio for the one or more regions based on each region's corresponding compression metric, wherein the compression ratio for the one or more regions increases as the amount of image noise indicated by the compression metric increases, and wherein the instructions to determine the compression ratio comprise instructions to:
set the compression ratio to a first value when the region's corresponding compression metric is less than a first threshold; and
set the compression ratio to a second value when the region's corresponding compression metric is greater than or equal to the first threshold, wherein the first value is less than the second value;
compress the one or more regions in accordance with each region's corresponding compression ratio; and
store the compressed image in a memory.

20. The programmable storage device of claim 19, wherein the instructions to determine a compression metric comprise instructions to perform a weighted combination of the at least one image characteristic to determine the compression metric, the weighted combination is based on how indicative the at least one image characteristic is in corresponding to the image noise at the one or more regions of the image.

* * * * *